United States Patent
Huang et al.

(10) Patent No.: US 11,133,916 B2
(45) Date of Patent: Sep. 28, 2021

(54) WIRELESS COMMUNICATION SYSTEM

(71) Applicant: WISTRON NEWEB CORPORATION, Hsinchu (TW)

(72) Inventors: Tsun-Che Huang, Hsinchu (TW); Horen Chen, Hsinchu (TW); Chieh-Wen Cheng, Hsinchu (TW); Shoou-Hann Huang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 211 days.

(21) Appl. No.: 16/541,311

(22) Filed: Aug. 15, 2019

(65) Prior Publication Data

US 2020/0153599 A1 May 14, 2020

Related U.S. Application Data

(60) Provisional application No. 62/757,791, filed on Nov. 9, 2018, provisional application No. 62/778,296, filed on Dec. 12, 2018, provisional application No. 62/797,951, filed on Jan. 29, 2019.

(51) Int. Cl.
*H04L 5/14* (2006.01)
*H04B 7/155* (2006.01)
*H04W 16/26* (2009.01)
*H04B 1/401* (2015.01)

(52) U.S. Cl.
CPC .......... *H04L 5/1461* (2013.01); *H04B 1/401* (2013.01); *H04B 7/1555* (2013.01); *H04B 7/15557* (2013.01); *H04W 16/26* (2013.01)

(58) Field of Classification Search
CPC ..... H04L 5/1461; H04B 7/1555; H04B 1/401; H04B 7/15557; H04B 7/15507; H04W 16/26; H01Q 3/2617; H01Q 1/525; H01Q 1/007; H01Q 1/241; H01Q 21/065
See application file for complete search history.

(56) References Cited

U.S. PATENT DOCUMENTS

2006/0205343 A1* 9/2006 Runyon ............. H04B 7/15571 455/11.1
2009/0243890 A1* 10/2009 Tzuang ................. G08G 1/015 340/934

(Continued)

OTHER PUBLICATIONS

Y. Zhang and J. Li, "A Dual-Polarized Antenna Array With Enhanced Interport Isolation for Far-Field Wireless Data and Power Transfer," in IEEE Transactions on Vehicular Technology, vol. 67, No. 11, pp. 10258-10267, Nov. 2018 (Year: 2018).*

(Continued)

*Primary Examiner* — Ayaz R Sheikh
*Assistant Examiner* — Tarell A Hampton
(74) *Attorney, Agent, or Firm* — McClure, Qualey & Rodack, LLP

(57) ABSTRACT

A wireless communication system includes a base station, a customer premise equipment (CPE) and a repeater. The repeater includes a down-link circuit and an up-link circuit. The down-link circuit includes a first receiving antenna array and a first transmitting antenna array, and the up-link circuit includes a second receiving antenna array and a second transmitting antenna array. The down-link circuit is separated from the up-link circuit with a first predetermined distance.

16 Claims, 16 Drawing Sheets

(56) References Cited

U.S. PATENT DOCUMENTS

| | | | |
|---|---|---|---|
| 2010/0066590 A1* | 3/2010 | Brown | G01S 13/42 |
| | | | 342/147 |
| 2016/0211575 A1* | 7/2016 | Tang | H01Q 21/064 |
| 2019/0113610 A1* | 4/2019 | Vacanti | G01S 7/282 |
| 2019/0356060 A1* | 11/2019 | Daniel | G01S 7/025 |

OTHER PUBLICATIONS

T. Snow, C. Fulton and W. J. Chappell, "Transmit-Receive Duplexing Using Digital Beamforming System to Cancel Self-Interference," in IEEE Transactions on Microwave Theory and Techniques, vol. 59, No. 12, pp. 3494-3503, Dec. 2011 (Year: 2011).*

K. E. Kolodziej, J. G. McMichael and B. T. Perry, "Simultaneous transmit and receive antenna isolation improvement in scattering environments," 2014 IEEE Antennas and Propagation Society International Symposium (APSURSI), 2014, pp. 2228-2229 (Year: 2014).*

E. A. Alwan, A. Hovsepian and J. L. Volakis, "Ultra-wideband dual polarization arrays with collocated elements for high isolation simultaneous transmit and receive systems," 2016 IEEE International Symposium on Phased Array Systems and Technology (PAST), 2016, pp. 1-3, (Year: 2016).*

D. Deslandes and K. Wu, "High Isolation Substrate Integrated Waveguide Passive Front-End for Millimeter-Wave Systems," 2006 IEEE MTT-S International Microwave Symposium Digest, 2006, pp. 982-985, (Year: 2006).*

A. T. Wegener and W. J. Chappell, "High isolation in antenna arrays for simultaneous transmit and receive," 2013 IEEE International Symposium on Phased Array Systems and Technology, 2013, pp. 593-597, (Year: 2013).*

Q. Xu, M. Biedka and Y. E. Wang, "Indented Antenna Arrays for High Isolation: The Growing Interest in Simultaneous-Transmit-and-Receive-Based Full-Duplex Communication Systems," in IEEE Antennas and Propagation Magazine, vol. 60, No. 1, pp. 72-80, Feb. 2018, (Year: 2018).*

M. E. Knox, "Single antenna full duplex communications using a common carrier," WAMICON 2012 IEEE Wireless & Microwave Technology Conference, 2012, pp. 1-6 (Year: 2012).*

J. P. Doane, K. E. Kolodziej and B. T. Perry, "Simultaneous transmit and receive with digital phased arrays," 2016 IEEE International Symposium on Phased Array Systems and Technology (PAST), 2016, pp. 1-6, (Year: 2016).*

T. J. Douglas and K. Sarabandi, "A High-Isolation Two-Port Planar Antenna System for Communication and Radar Applications," in IEEE Access, vol. 6, pp. 9951-9959, 2018, (Year: 2018).*

M. Elmansouri, P. Valaleprasannakumar, E. Tianang, E. Etellisi and D. Filipovic, "Single and dual-polarized wideband simultaneous transmit and receive antenna system," 2017 IEEE International Symposium on Antennas and Propagation & USNC/URSI National Radio Science Meeting, 2017, pp. 1105-1106 (Year: 2017).*

J. M. Laco, F. H. Gregorio and J. Cousseau, "Antenna array design for full duplex applications," 2015 XVI Workshop on Information Processing and Control (RPIC), 2015, pp. 1-5, (Year: 2015).*

A. T. Wegener, "Broadband near-field filters for Simultaneous Transmit and Receive in a small two-dimensional array," 2014 IEEE MTT-S International Microwave Symposium (IMS2014), 2014, pp. 1-3, (Year: 2014).*

H. Nawaz and I. Tekin, "Dual polarized patch antenna with high inter-port isolation for 1GHz in-band full Duplex applications," 2016 IEEE International Symposium on Antennas and Propagation (APSURSI), 2016, pp. 2153-2154, (Year: 2016).*

B. Tomasic, J. Turtle, R. Schmier, S. Bharj, S. Liu and P. Oleski, "Transmit-receive isolation in phased array antennas for duplex communication systems," 17th International Conference on Applied Electromagnetics and Communications, 2003. ICECom 2003., 2003, pp. 360-365 (Year: 2003).*

* cited by examiner

WIRELESS COMMUNICATION SYSTEM

CROSS-REFERENCE TO RELATED PATENT APPLICATION

This application claims priority from the U.S. Provisional Patent Application Ser. No. 62/757,791 filed Nov. 9, 2018, Ser. No. 62/778,296 filed Dec. 12, 2018, and Ser. No. 62/797,951 filed Jan. 29, 2019, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a wireless communication system, and more particularly to a wireless communication system for improving isolations between transmitting and receiving antenna arrays.

BACKGROUND OF THE DISCLOSURE

Fifth generation (5G) communications systems provide a dramatic increase in data rates over existing technologies while allowing network access for many devices. In order to meet system demands for capacity and throughput, antennas with high gain and multi-beams are required. Furthermore, the high data rates anticipated for 5G encourage the use of millimeter wave frequency bands in addition to the traditional frequency bands used by earlier mobile technologies such as 4G; 3G, etc.

In the 5G mobile communication, both sub-6 GHz and above-6 GHz frequency bands will be used. In order to provide ubiquitous 5G coverage for both outdoor and indoor environments, repeaters are often required to extend transmission distance and coverage. However, interferences between transmitting and receiving ends of the repeaters can be severe.

Furthermore, high frequency signals are utilized in the 5G NR communication. To provide enough coverage for all environments, repeaters are often required to extend the transmission distance. However, reducing the interference between Tx & Rx of the Donor antenna and that of the Relay (or service) antenna is crucial for proper operation of a full-duplex repeater. Some methods are needed to enhance both the Donor Tx/Rx isolation and the Relay Tx/Rx antenna isolation.

SUMMARY OF THE DISCLOSURE

In response to the above-referenced technical inadequacies, the present disclosure provides a wireless communication system capable of increasing isolations between transmitting and receiving antenna arrays of a donor device and transmitting and receiving antenna of a service device.

In one aspect, the present disclosure provides a wireless communication system including a customer premise equipment (CPE) and a repeater. The repeater includes a down-link circuit and an up-link circuit. The down-link circuit includes a first receiving antenna array disposed on a first substrate and configured to receive signals from the base station and a first transmitting antenna array disposed on a second substrate and coupled to the first receiving antenna array, and the first transmitting antenna array is configured to transmit signals to the CPE. The up-link circuit, includes a second receiving antenna array disposed on a third substrate, wherein the second receiving antenna array is configured to receive signals from the CPE and a second transmitting antenna array disposed on a fourth substrate and coupled to the second receiving antenna array, and the second transmitting antenna array is configured to transmit signals to the base station. The down-link circuit is separated from the up-link circuit with a first predetermined distance, the first substrate is disposed along a first reference plane, the fourth substrate is disposed along a second reference plane, and the first reference plane is parallel with the second reference plane, a first vector is provided along a first reference line formed by a first reference point on the first substrate and a second reference point on the fourth substrate, and a first angle is provided between the first vector and a normal vector of the first reference plane.

The wireless communication system provided by the present disclosure utilizes the Space Division Duplex (SDD) architecture, in which the down-link circuit is separated from the up-link circuit with a predetermined distance, so as to provide enough isolation between the up-link circuit and the down-link circuit.

Furthermore, the wireless communication system provided by the present disclosure utilizes orthogonal polarizations between the receiving ends and the transmitting ends of the repeater, thereby enhancing four types of isolations to allow a full-duplex repeater to work properly.

In addition, the wireless communication system provided by the present disclosure provides the short side displacement for a third antenna array of the CPE, thereby obtaining a broader beam with lower gain difference between the first transmitting antenna array and the second receiving antenna array to avoid large loop gain and reach gain balance.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
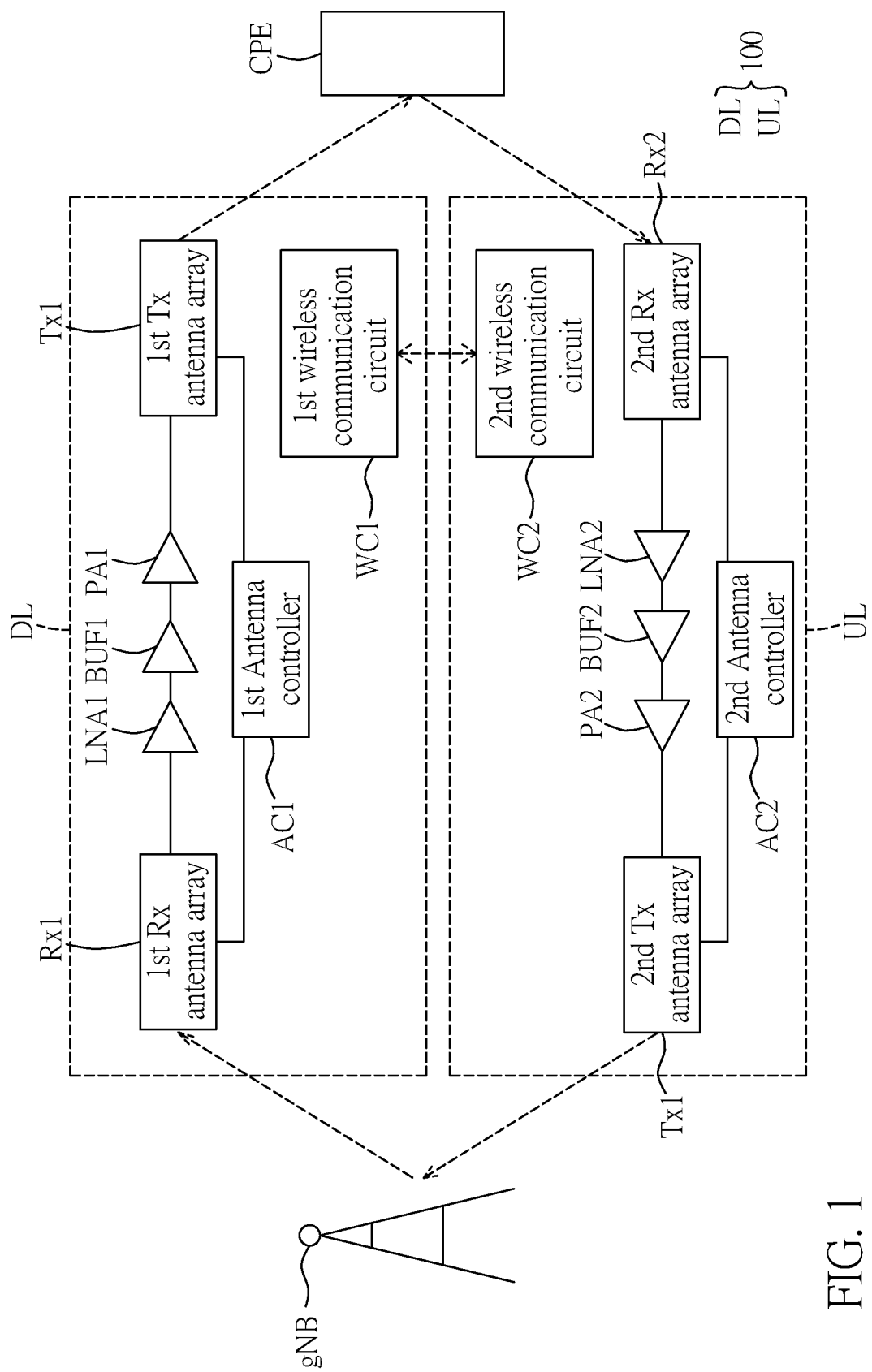
FIG. 1 is a block diagram of a wireless communication system according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
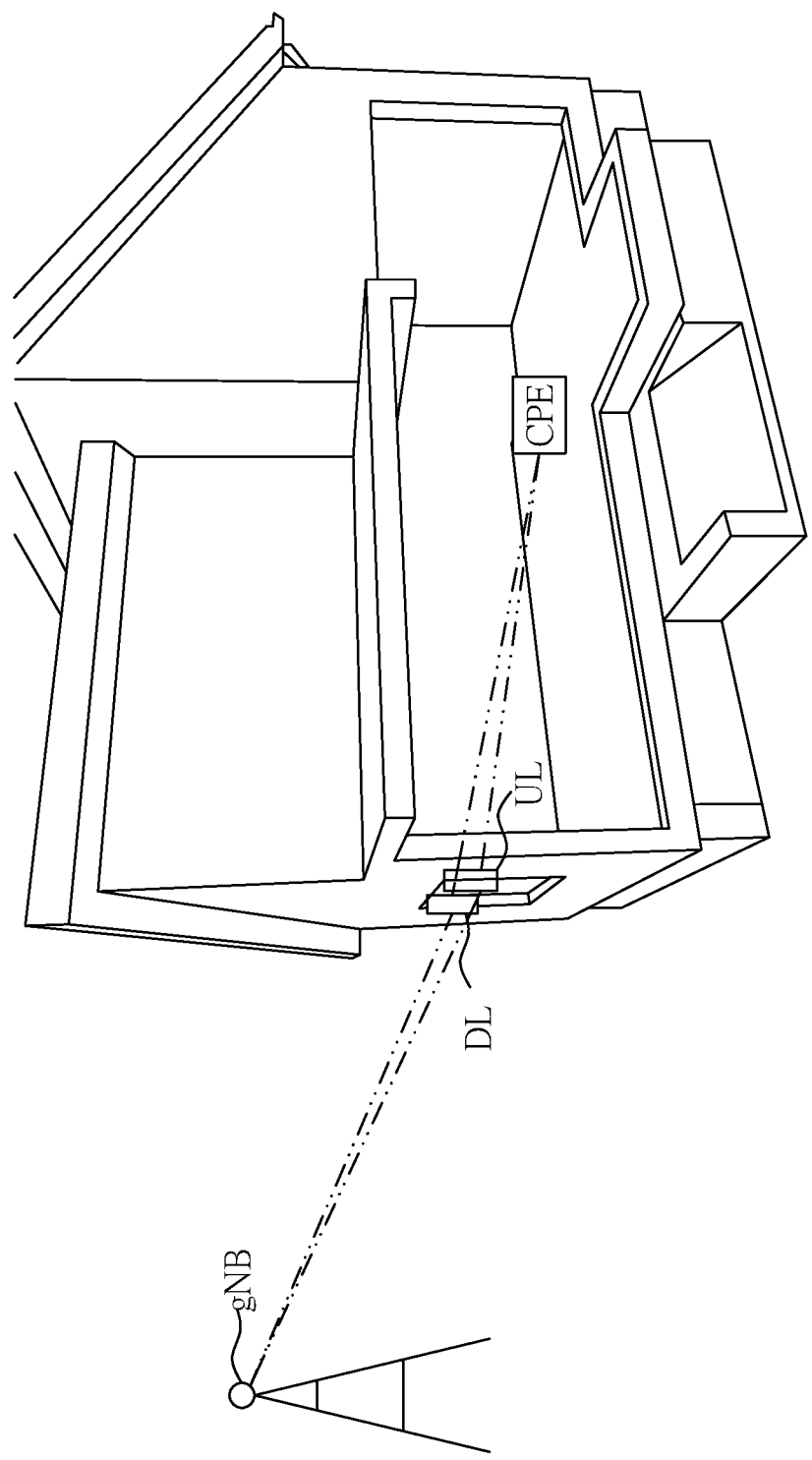
FIG. 2 is a schematic view showing a typical usage scenario of the wireless communication system according to an embodiment of the present disclosure.
Figure 3:
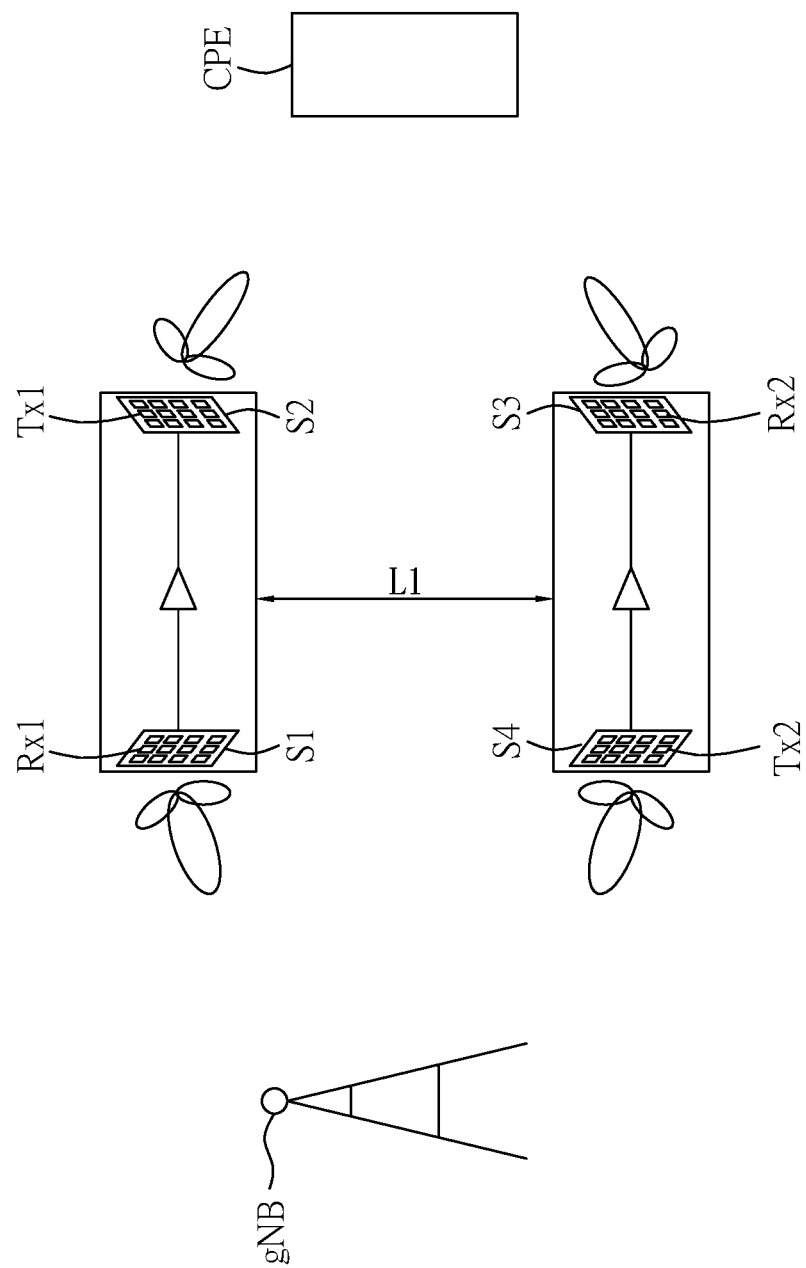
FIG. 3 is a scenario of the wireless communication system for avoiding interferences using Space Division Duplex (SDD) according to an embodiment of the present disclosure.

FIG. 1 is a block diagram of a wireless communication system according to an embodiment of the present disclosure, FIG. 2 is a schematic view showing a typical usage scenario of the wireless communication system according to an embodiment of the present disclosure, and FIG. 3 is a scenario of the wireless communication system for avoiding interferences using Space Division Duplex (SDD) according to an embodiment of the present disclosure.

Referring to FIGS. 1 to 3, the present disclosure provides a wireless communication system including a base station gNB, a customer premise equipment (CPE) and a repeater 100. In certain cases, a direct path of transmission between a base station gNB and a CPE is blocked by an obstacle, such as a building, which results in a path loss larger than a predetermined value, e.g., 140 dB, the repeater 100 can be arranged to provide an alternative path between the base station gNB and the customer premise equipment CPE, such that the path loss can be reduced.

In telecommunications, the CPE can be any terminal and associated equipment located at a subscriber's premises and connected with a carrier's telecommunication circuit at a demarcation point. The demarcation point is a point established in a building or complex to separate customer equipment from the equipment located in either the distribution infrastructure or central office of the communications service provider. The CPE may include various types of terminal equipment to process received signals to thereby enable subscribers to access to the services.

The 5G communication system is considered to be implemented in higher frequency (mmWave) bands, for example, 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, and large scale antenna techniques are discussed in 5G communication systems.

In the present embodiment, the repeater 100 includes a down-link circuit DL and an up-link circuit UL. The down-link circuit DL includes a first receiving antenna array Rx1 disposed on a first substrate S1 and configured to receive signals from the base station gNB, and a first transmitting antenna array Tx1 disposed on a second substrate S2 and coupled to the first receiving antenna array Rx1. The first transmitting antenna array Tx1 is configured to transmit signals to the CPE.

On the other hand, the up-link circuit UL includes a second receiving antenna array disposed on a third substrate S3, and a second transmitting antenna array Tx2 disposed on a fourth substrate S4 and coupled to the second receiving antenna array Rx2. The second receiving antenna array Rx2 is configured to receive signals from the CPE, and the second transmitting antenna array Tx2 is configured to transmit signals to the base station gNB.

As shown in FIG. 2, the up-link circuit UL and the down-link circuit DL of the repeater 100 can be separately disposed next to the window. Signals from the base station gNB are received by the down-link circuit DL, and an internal RF circuit is applied to transmit received signals to the CPE. The up-link circuit UL then communicates with the customer premise equipment CPE and receives data.

Specifically, the down-link circuit DL further includes a first low noise amplifier LNA1 coupled to the first receiving antenna array Rx1, a first buffer circuit BUF1 coupled to the first low noise amplifier LNA1, and a first power amplifier PA coupled between the first buffer circuit BUF1 and the first transmitting antenna Tx1.

The up-link circuit UL further includes a second low noise amplifier LNA2 coupled to the second receiving antenna Rx2, a second buffer circuit BUF2 coupled to the second low noise amplifier LNA2, and a second power amplifier PA2 coupled between the second buffer circuit BUF2 and the second transmitting antenna array Tx2.

Regarding to the down-link circuit DL, signals are transmitted from the base station gNB to the first receiving antenna array Rx1, and then transmitted through the LNA1, the BUF1, and the PA to reach the first transmitting antenna Tx1. After the signals are amplified by the LNA1 and the PA1, the signals with higher levels are transmitted from the first transmitting antenna Tx1 to the CPE.

Similar to the down-link circuit DL, signals in the up-link circuit UL are transmitted from the CPE to the second receiving antenna Rx2, and then transmitted through the LNA2, the BUF2, and the PA2 to reach the second transmitting antenna array Tx2. After the signals are amplified by the LNA2 and the PA2, the signals with higher levels are transmitted from the second transmitting antenna array Tx2 to the base station gNB.

In order to provide enough isolation between the up-link circuit UL and the down-link circuit DL, the Space Division Duplex (SDD) architecture is utilized. As shown in FIG. 3, the down-link circuit DL is separated from the up-link circuit UL with a first predetermined distance L1.

In this case, the physical spacing, such as the first predetermined distance L1 between the first transmitting antenna array Tx1 and the second receiving antenna array Rx2 is provided. The larger the first predetermined distance L1 is, the larger isolation can be obtained.

Figure 4:
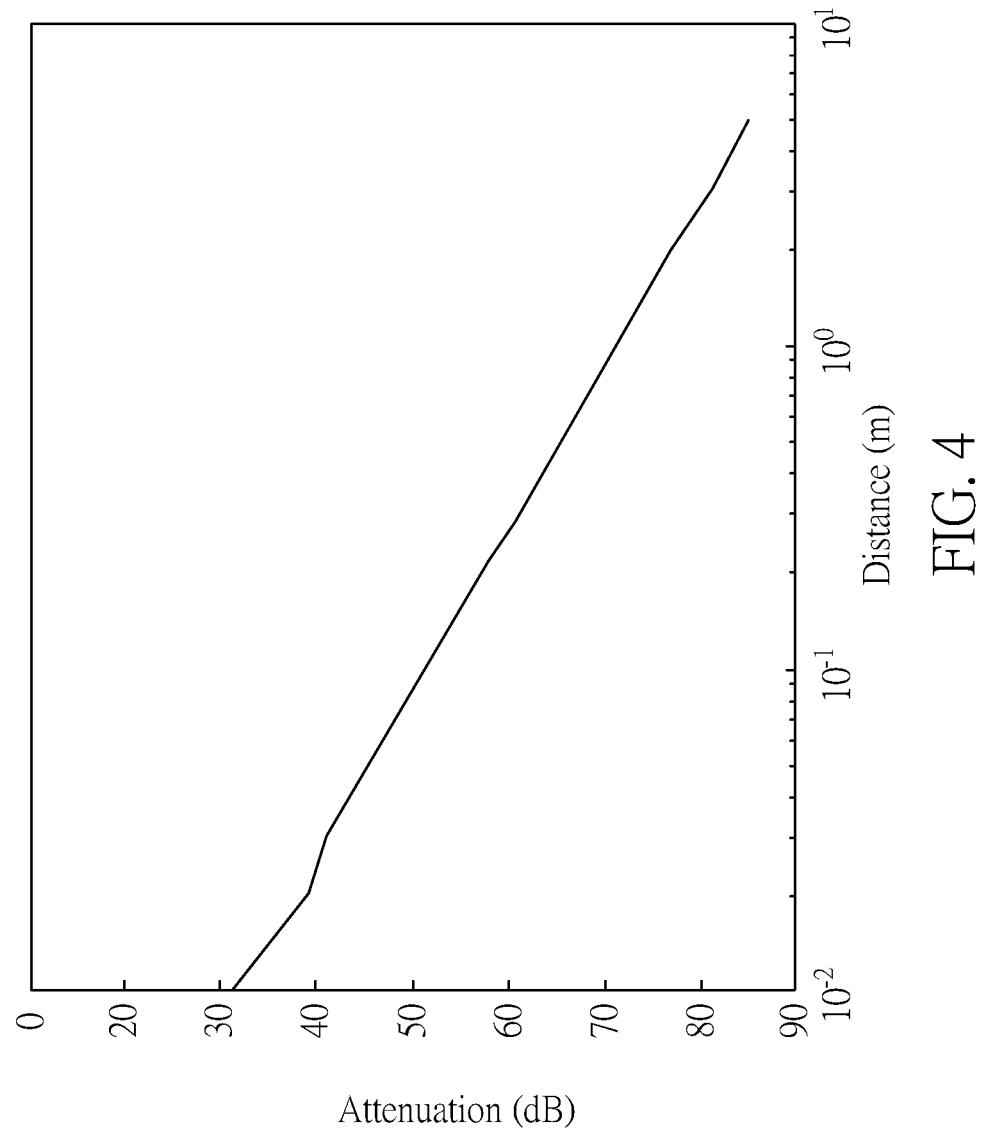
FIG. 4 is plot diagram showing a path loss calculated with the changing first predetermined distance according to an embodiment of the present disclosure.

Reference is made to FIG. 4, which is plot diagram showing a path loss calculated with the changing first predetermined distance according to an embodiment of the present disclosure. As can be seen from FIG. 4, the isolation between the first transmitting antenna array Tx1 and the second receiving antenna array Rx2 will be improved 20 dB when the distance is extended 10 times.

Figure 5:
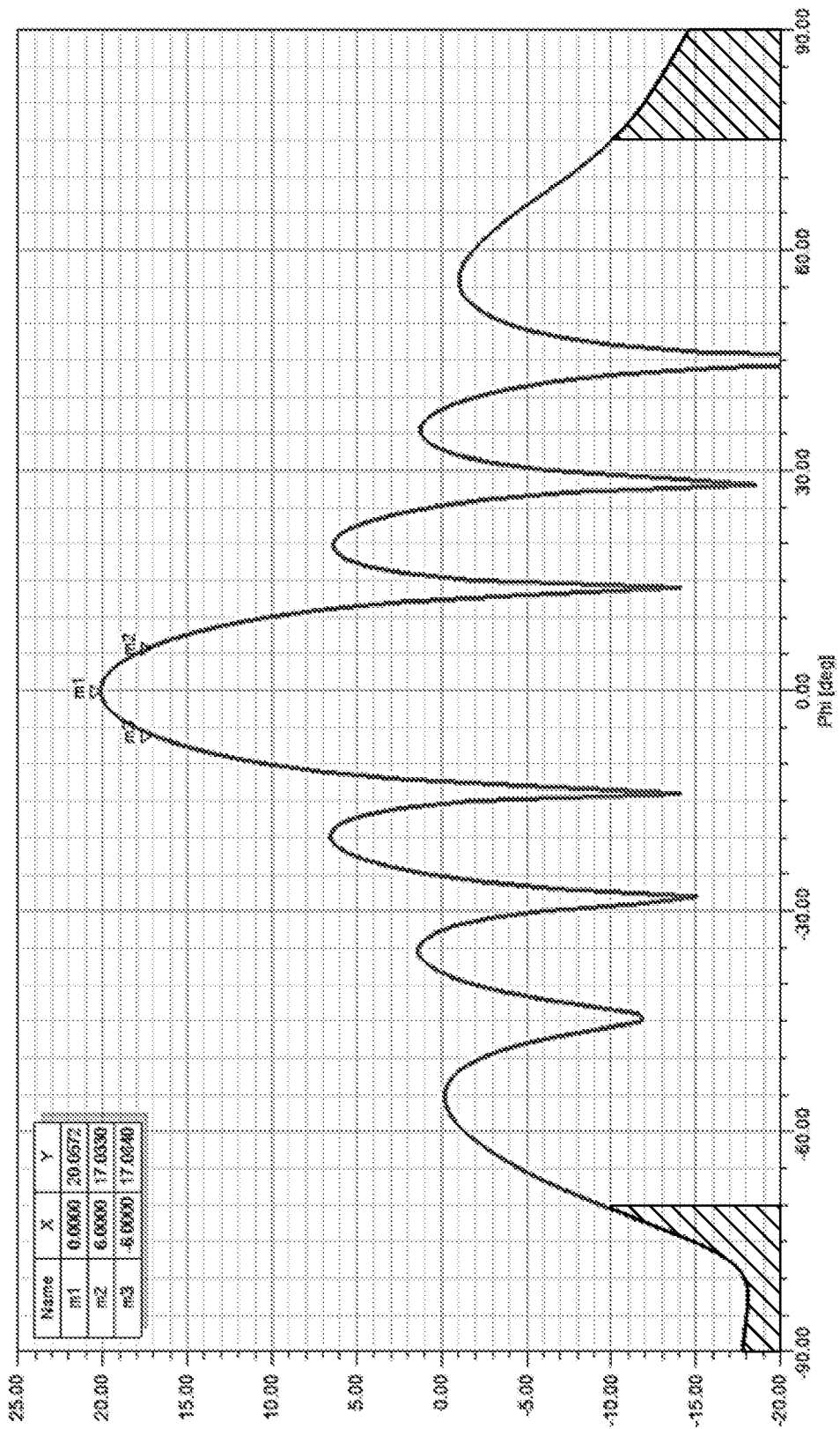
FIG. 5 is a radiation pattern of the first transmitting antenna array according to an embodiment of the present disclosure.

Reference is now made to FIG. 5, which is a radiation pattern of the first transmitting antenna array according to an embodiment of the present disclosure. As can be seen from FIG. 5, a peak gain of the first receiving array is about 20 dBi, and the peak gain at ±90 degree is lower than −10 dBi. If the second transmitting antenna array Tx2 is disposed side-by-side with the first receiving antenna array Rx1, isolation can be improved by 10 dB while comparing with an isotropic radiation case (that is, 0 dBi in all direction).

Therefore, for the second transmitting antenna array Tx2 and the first receiving antenna array Rx1, the isolation can be improved by 20 dB in total. To push this idea further, nulls of radiation patterns of the second transmitting antenna array Tx2 and the first receiving antenna array Rx1 can be directed to each other, which can create the highest isolation between the second transmitting antenna array Tx2 and the first receiving antenna array Rx1. This method is also called null steering, since a null of the second transmitting antenna array Tx2 (or the first receiving antenna array Rx1) is directed to the other null of the first receiving antenna array Rx1 (the second transmitting antenna array Tx2).

Figure 6:
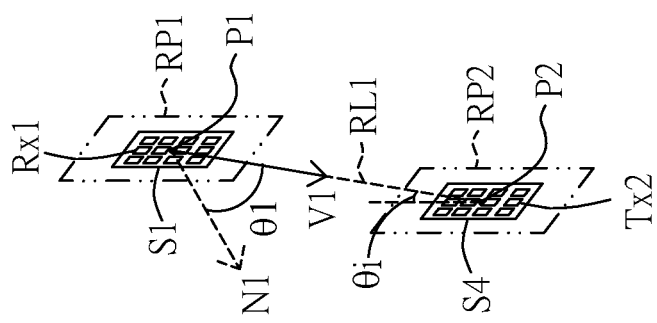
FIG. 6 is a perspective view showing an arrangement of the first receiving antenna array and the second transmitting antenna array according to an embodiment of the present disclosure.

Reference is made to FIG. 6, which is a perspective view showing an arrangement of the first receiving antenna array Rx1 and the second transmitting antenna array Tx2 according to an embodiment of the present disclosure. As shown, reference planes correspond to the first substrate S1 and the fourth substrate S4 should be defined. The first substrate S1 can be defined to be disposed along a first reference plane RP1, the fourth substrate S4 can be defined to be disposed along a second reference plane RP2, and the first reference plane RP1 is substantially parallel with the second reference plane RP2. Preferably, the first reference plane RP1 is parallel with the second reference plane RP2 because the transceiving target is the base station gNB.

Furthermore, a first angle θ1 is further defined between a first vector V1 along a first reference line RL1 formed by a first reference point P1 on the first substrate S1 and a second reference point P2 on the fourth substrate S4, and a first angle θ1 is provided between the first vector V1 and a normal vector N1 of the first reference plane RP1.

To ensure desired isolation between the first receiving antenna array Rx1 and the second transmitting antenna array Tx2, the first receiving antenna array Rx1 and the second transmitting antenna array Tx2 should be placed in a certain range. Take 20 dB as an example, more than 10 dB isolation is needed at both sides of the first receiving antenna array Rx1 and the second transmitting antenna array Tx2. The range guarantees 10 dB isolation for single side is shown in FIG. 5, it can be seen that an included angle θi between the first reference line RL1 and the first reference plane RP1 should not beyond ±10 degree, that is, the first angle θ1 should range from 80 degrees to 100 degrees.

Furthermore, a similar configuration can be extended to a configuration between the first transmit antenna array Tx1 and the second receive antenna array Rx1.

Since the signals are amplified in the down-link circuit DL and up-link circuit UL, four types of interferences can be found between the first transmitting antenna array Rx1 and the first transmitting antenna Tx1, between the first transmitting antenna Tx1 and the second receiving antenna Rx2, between the second receiving antenna Rx2 and the second transmitting antenna array Tx2, and between the first receiving antenna Rx1 and the second transmitting antenna Tx1. Therefore, various configurations are provided in the present disclosure to enhance isolations between transmitting end and receiving ends of the repeater 100 to solve issues of the interferences.

In this case, orthogonal polarizations are utilized. Reference is made to FIGS. 7A to 7D, which are schematic diagrams showing examples for polarizations of the first receiving antenna array, the first transmitting antenna array, the second receiving antenna array and the second transmitting antenna array according to embodiments of the present disclosure.

Figure 7B:
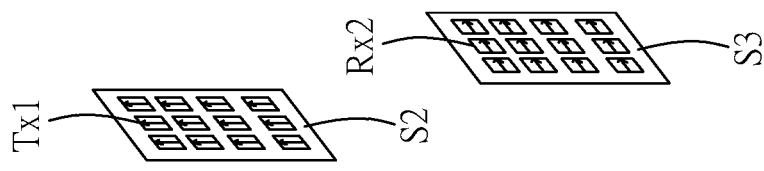
FIGS. 7A to 7D are schematic diagrams showing examples for polarizations of the first receiving antenna array, the first transmitting antenna array, the second receiving antenna array and the second transmitting antenna array according to embodiments of the present disclosure.
Figure 7A:
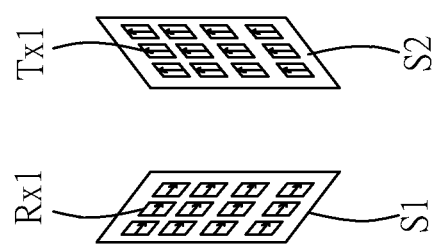

As shown in FIG. 7A, the first receiving antenna array Rx1 of the repeater 100 faces the base station gNB while the first transmitting antenna array Tx1 faces the CPE. Taking a transmission path for the down-link circuit DL as an example, a link between the base station gNB and the repeater 100 utilizes horizontal polarization for the first receiving antenna array Rx1, and a link between the repeater 1 and the CPE should use vertical polarization for the first transmitting antenna array Tx1. Since the first receiving antenna array Rx1 and the first transmitting antenna array Tx1 are orthogonally polarized with each other, the isolation between the first receiving antenna array Rx1 and the first transmitting antenna array Tx1 can be enhanced.

Specifically, the first receiving antenna array Rx1 and the first transmitting antenna array Tx1 can be patch antenna arrays, in which feeding points can be utilized to provide two directions of polarization for the first receiving antenna array Rx1 and the first transmitting antenna array Tx1, respectively, and the directions of polarization of the first receiving antenna array Rx1 and the first transmitting antenna array Tx1 are orthogonally polarized with each other, as shown in FIG. 7A.

As shown in FIG. 7B, the first transmitting antenna array Tx1 and the second receiving antenna array Rx2 of the repeater 100 face the CPE. Considering a case where the signals are transmitting through the down-link circuit DL and the up-link circuit UL at the same time, a link between the repeater 100 and the CPE utilizes vertical polarization for the first transmitting antenna array Tx and vertical polarization for the second receiving antenna array Rx2. Since the second receiving antenna array Rx2 and the first transmitting antenna array Tx1 are orthogonally polarized with each other, the isolation between the second receiving antenna array Rx2 and the first transmitting antenna array Tx1 can be enhanced.

Figure 7D:
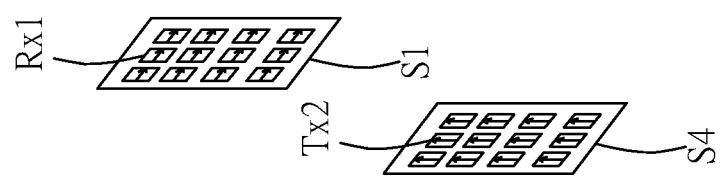
Figure 7C:
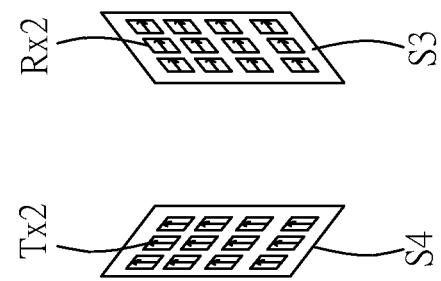

As shown in FIG. 7C, the second transmitting antenna array Tx2 of the repeater 100 faces the base station gNB while the second receiving antenna array Rx2 faces the CPE. Taking a transmission path for the up-link circuit UL as an example, a link between the base station gNB and the repeater 100 utilizes vertical polarization for the second transmitting antenna array Tx2. A link between the repeater 1 and the CPE should use horizontal polarization for the second receiving antenna array Rx2, and since the first receiving antenna array and the first transmitting antenna array are orthogonally polarized with each other, the isolation between the first receiving antenna array Rx1 and the first transmitting antenna array Tx1 can be enhanced.

As shown in FIG. 7D, the first receiving antenna array Rx1 and the second transmitting antenna array Tx2 of the repeater 100 face the base station gNB. Considering a case where the signals are transmitting through the down-link circuit DL and the up-link circuit UL at the same time, a link between the repeater 100 and the CPE utilizes horizontal polarization for the first receiving antenna array Rx1 and vertical polarization for the second transmitting antenna array Tx2. Since the first receiving antenna array Rx1 and the second transmitting antenna array Tx2 are orthogonally polarized with each other, the isolation between the first receiving antenna array Rx1 and the second transmitting antenna array Tx2 can be enhanced.

Since the first receiving antenna array Rx1, the first transmitting antenna array Tx1, the second receiving antenna array Rx2 and the second transmitting antenna array Tx2 are orthogonally polarized with one another, an additional isolation between transmitting ends and receiving ends of the repeater 100 can be guaranteed.

Specifically, in order to allow a full-duplex repeater to work properly, the configuration depicted in FIGS. 7A to 7D can be utilized to enhance four types of isolations. First type of isolation is provided between the second transmitting antenna array Tx1 and the first receiving antenna array Rx1, the isolation has to be sufficiently high to avoid weak signals of the first receiving antenna array Rx1 of the down-link circuit DL from being interfered by strong signals of the second transmitting antenna array Tx1.

Further, second type of isolation is provided between the first transmitting antenna array Tx1 and the second receiving antenna array Rx1, the isolation has to be sufficiently high to avoid signals of the second receiving antenna array Rx2 of the up-link circuit UL from being interfered by signals of the first transmitting antenna array Tx1.

In addition, third type of isolation is provided between the first receiving antenna array Rx1 and the first transmitting antenna array Tx1, the isolation has to be much higher than a gain of the down-link circuit DL of the repeater 100 (sufficiently high to avoid weak signals of the first receiving antenna array Rx1 from being interfered by strong signals of the first transmitting antenna array Tx1) to avoid oscillation of the first power amplifier PA1 in the down-link circuit DL.

Fourth type of isolation is provided between the second receiving antenna array Rx2 and the second transmitting antenna array Tx2, the isolation has to be much higher than a gain of the up-link circuit UL of the repeater 100 (sufficiently high to avoid weak signals of the second receiving antenna array Rx1 from being interfered by strong signals of the second transmitting antenna Tx1 signal) to avoid oscillation of the second power amplifier PA2 in the up-link circuit UL.

Figure 8:
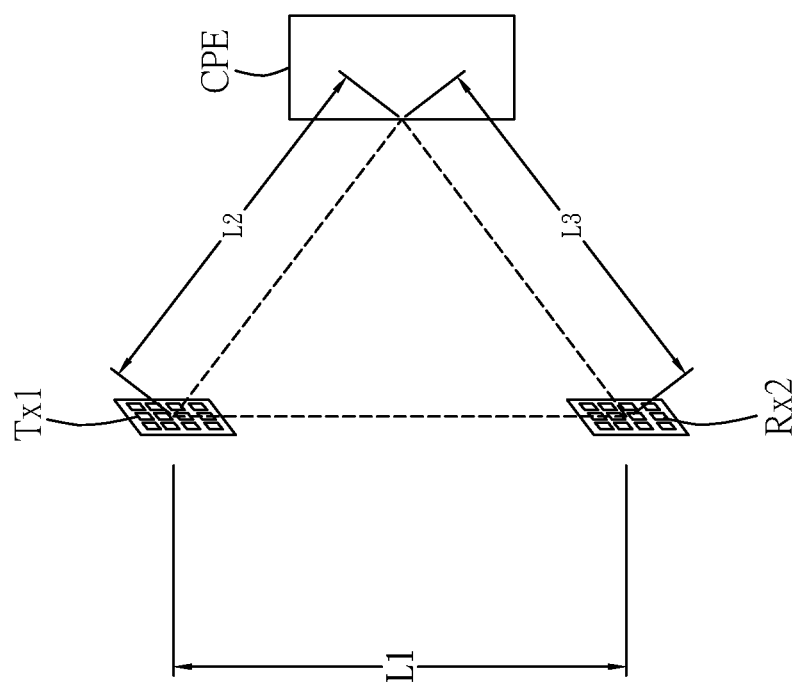
FIG. 8 is another schematic diagram showing an arrangement of the first transmitting array, the second receiving antenna array and the CPE according to an embodiment of the present disclosure.

Reference is now made to FIG. 8, which is another schematic diagram showing an arrangement of the first transmitting array, the second receiving antenna array and the CPE according to an embodiment of the present disclosure.

For increasing isolation between the second transmitting antenna array Tx2 and the second receiving antenna array Rx2 to be higher than the gain of the up-link circuit UL, increasing isolation between the first receiving antenna array Rx1 and the first transmitting antenna array Tx1 to be higher than the gain of the down-link circuit DL, and increasing isolation between the first transmitting antenna array Tx1 and the second receiving antenna array Rx2, Space Division Duplex (SDD) could also be utilized. Based on a typical operational scenario, the CPE needs to increase an equivalent isotropically radiated power (EIRP) for the up-link circuit UL to be much higher than coupling or leakage in the down-link circuit DL from the first transmitting antenna array Tx1 to the second receiving antenna array Rx2. The gains of the up-link circuit UL and the down-link circuit DL need to be sufficient high to overcome path losses between the first transmitting antenna array Tx1 and the CPE, and between the second receiving antenna array Rx2 and the CPE for the up-link circuit UL and the down-link circuit DL.

In this case, the first transmitting antenna array Tx and the second receiving antenna array Rx2 are separated from the CPE with a second predetermined distance L2 and a third predetermined distance L3, respectively, and the second predetermined distance L2 and the third predetermined distance L3 should be shorter than the first predetermined distance L1. For example, the second predetermined distance L2 and the third predetermined distance L3 can range from 1 meter to 3 meters, and the second predetermined distance L2 and the third predetermined distance L3 can be equal.

Therefore, since the first transmitting antenna array Tx1, the second receiving antenna array Rx2 and the CPE are disposed close to one another, the required gains of the up-link circuit UL and the down-link circuit DL are reduced.

Figure 9:
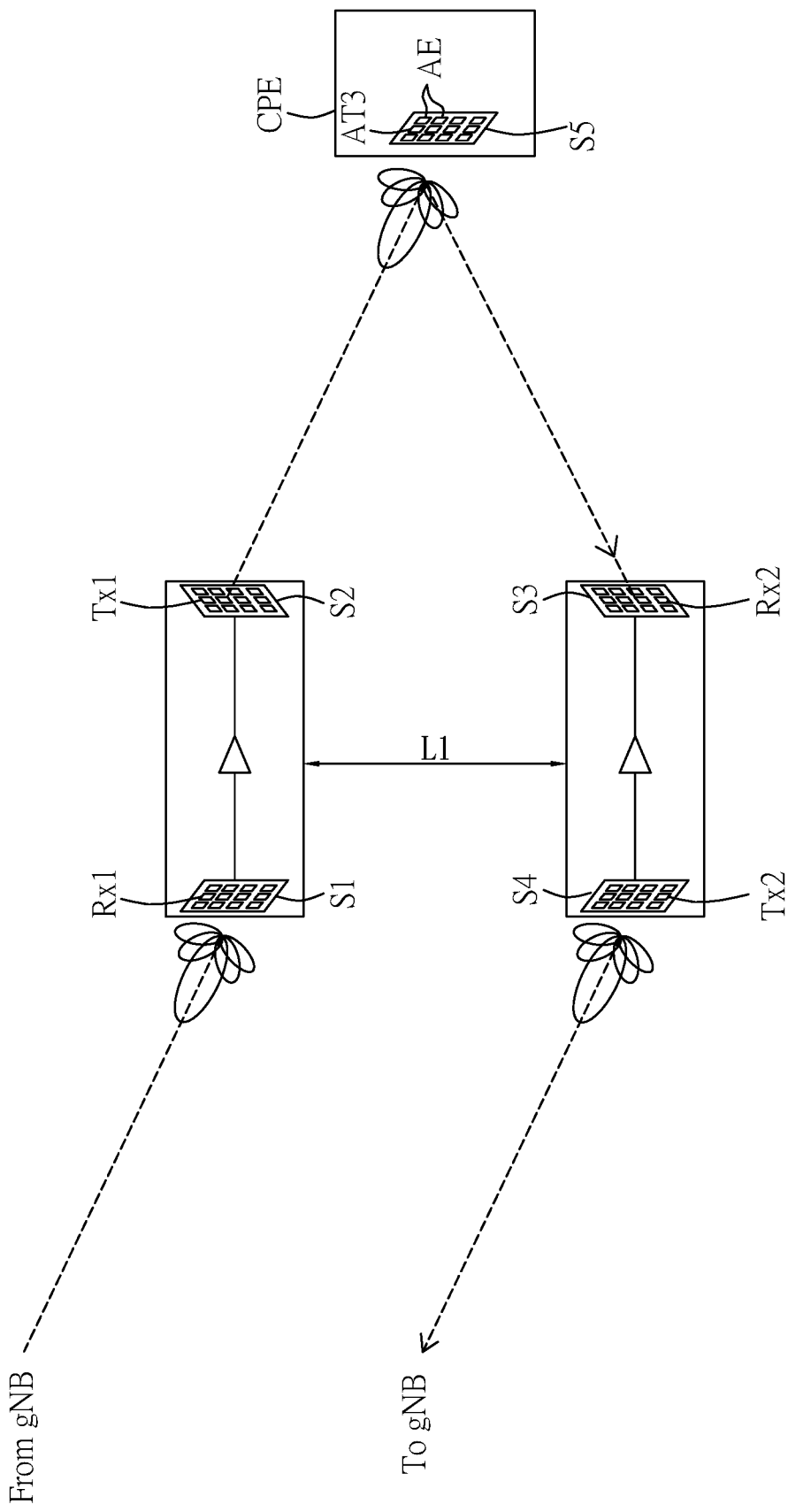
FIG. 9 is an example showing 5G up-link and down-link scenario using repeater as a relay according to an embodiment of the present disclosure.

Reference is further made to FIG. 9, which is an example showing 5G up-link and down-link scenario using repeater as a relay according to an embodiment of the present disclosure. As shown, the first receiving antenna array Rx1 and the second transmitting antenna array Tx2 of the repeater 100 are directed to the base station gNB far away while the first transmitting antenna array Tx1 and the second receiving antenna array Rx1 of the repeater 100 is connected with the CPE as an indoor unit, and the CPE includes a third antenna array AT3 disposed on a fifth substrate S5.

Figure 10:
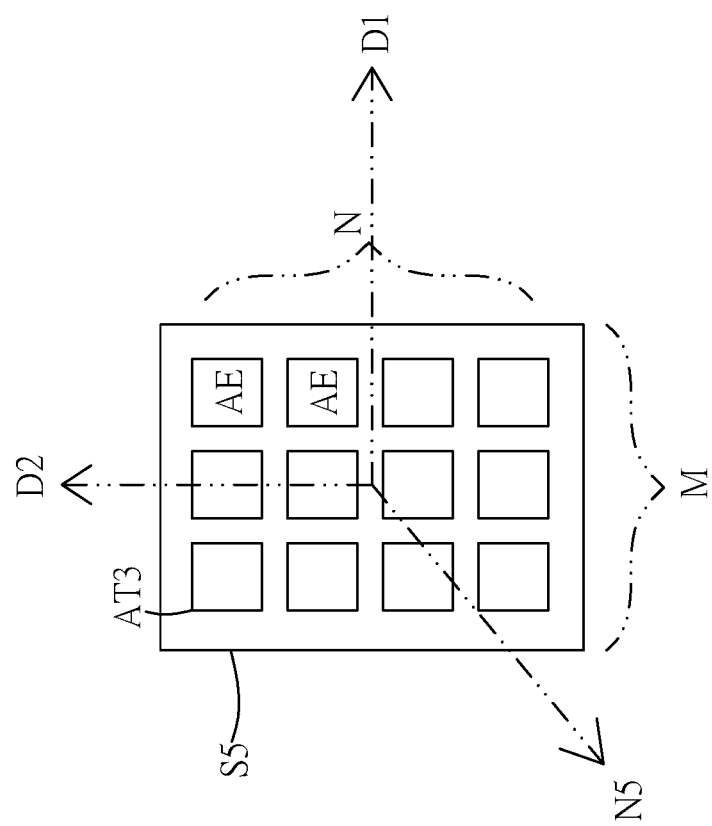
FIG. 10 is a perspective view of the third antenna array of the CPE according to an embodiment of the present disclosure.
Figure 11:
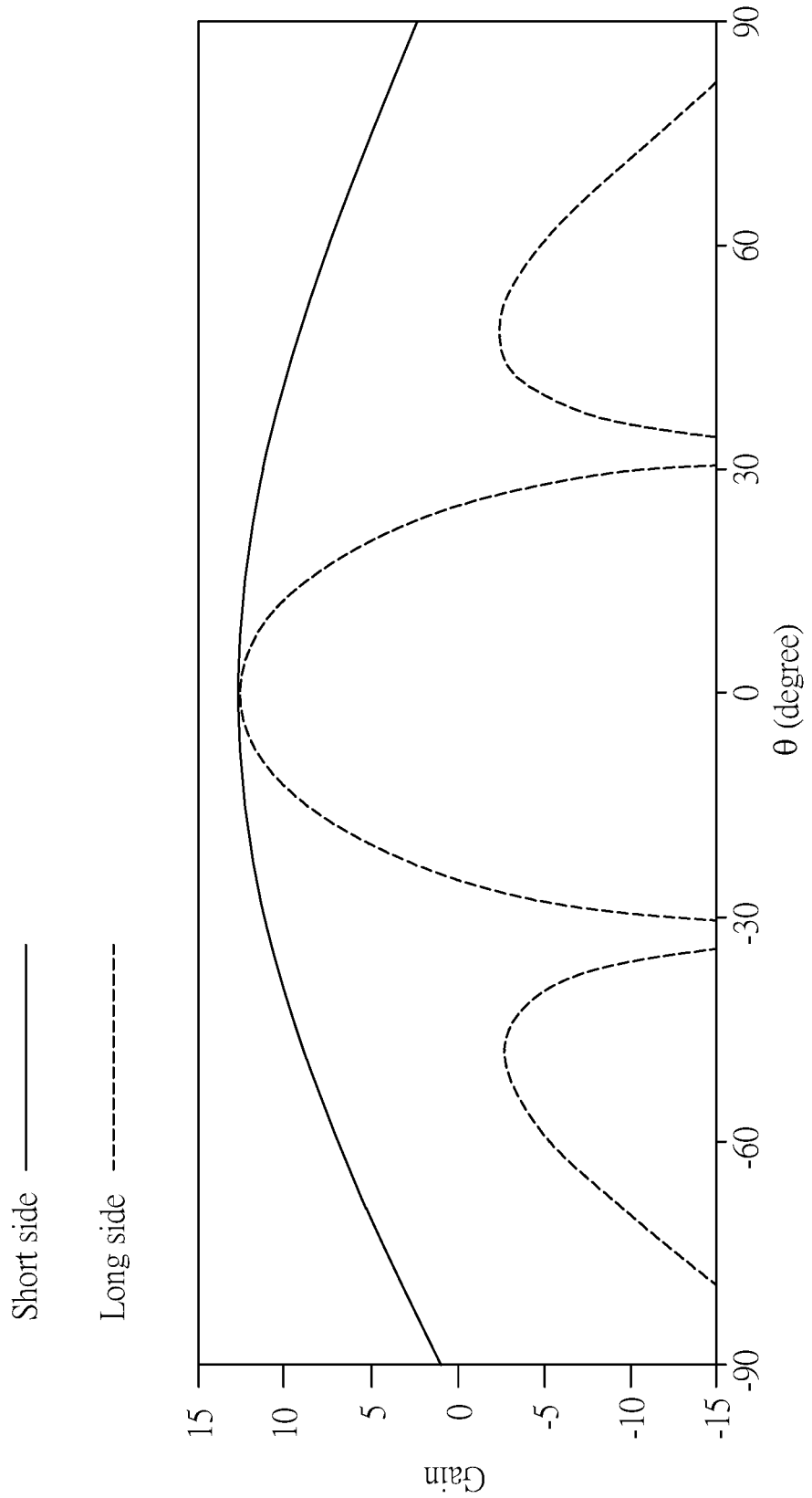
FIG. 11 is a schematic view showing horizontal cuts of the radiation patterns of the third antenna array AT3 disposed in two different types of placements according to an embodiment of the present disclosure.

Referring to FIG. 10, which is a perspective view of the third antenna array of the CPE according to an embodiment of the present disclosure. As shown, the third antenna array AT3 includes a plurality of antenna elements AE arranged as a two-dimensional array, the two-dimensional array has M antennas elements arranged along a first direction X and N antenna elements arranged a second direction Y, the first direction X is perpendicular to the second direction Y, and the first direction and the second direction are perpendicular to a normal direction Z of the fifth substrate S5. Preferably, M and N are integers, and M is smaller than N.

In this case, the third antenna array AT3 uses M*N antenna array, and a radiation pattern of the third antenna array AT3 is direct to the first transmitting antenna array Tx1. In order to compensate path losses between the repeater 100 and the CPE, the gain of repeater 100 should be sufficient high. Thus, a space between the up-link circuit UL and the down-link circuit DL should be long enough to prevent oscillation in full-duplex mode. In this scenario, the up-link circuit UL and the down-link circuit DL are considered to be separated from each other with the first predetermined distance L1 about 2~5 meters. Thus, the CPE will have lower gain for the second receiving antenna array Rx2 while comparing with the gain to the first transmitting antenna array Tx1 due to the radiation pattern of the third antenna array AT3.

If the distance between the CPE and the repeater 100, and the first predetermined distance L1 between the up-link circuit UL and the down-link circuit DL are fixed, an arrangement of the third antenna array AT3 needs to be considered. Here, M*N=1*4 is chosen as an example for the third antenna array AT3 hereinafter.

Figure 12:
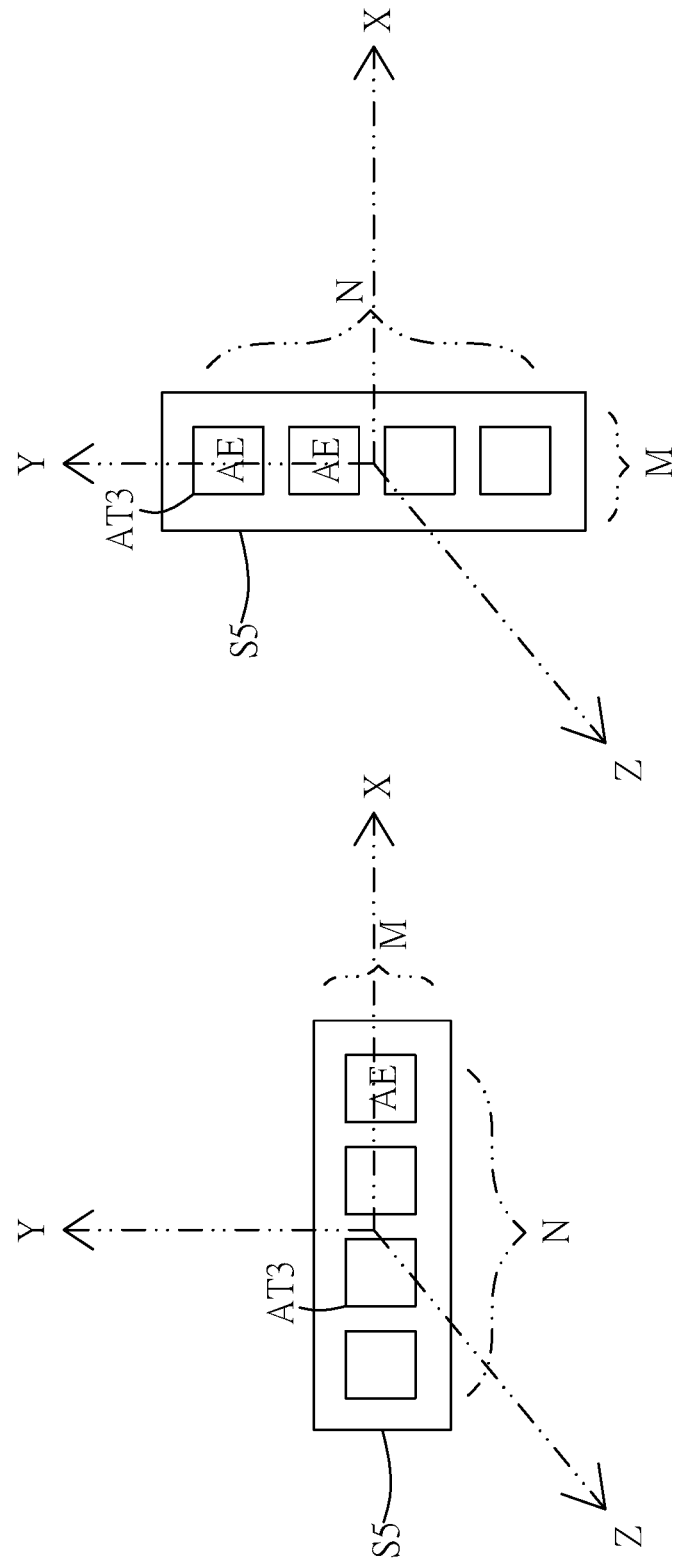
FIG. 12A is a perspective view of the third antenna array disposed in a long side placement according to an embodiment of the present disclosure.
FIG. 12B is a perspective view of the third antenna array disposed in a short side placement according to an embodiment of the present disclosure.
Figure 13:
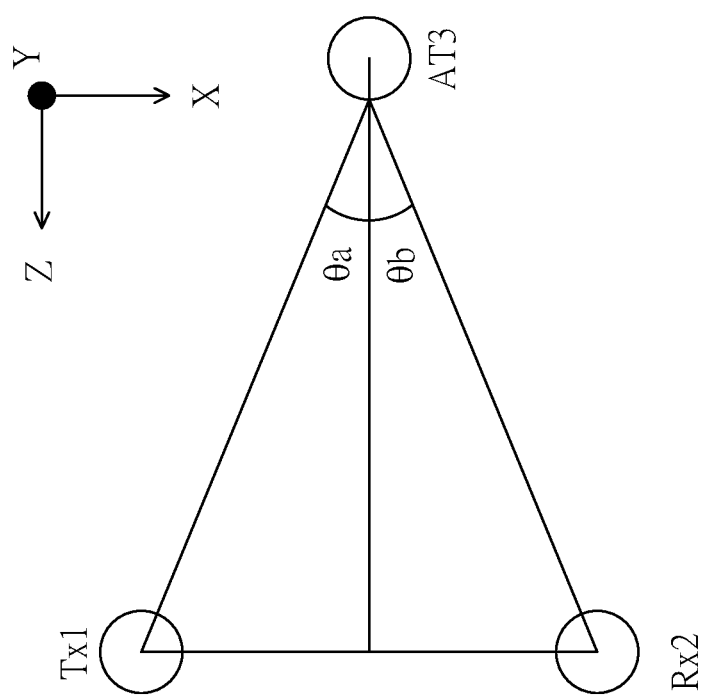
FIG. 13 is a top view showing an arrangement of the up-link circuit, the down-link circuit and the CPE according to an embodiment of the present disclosure.

Reference is now made to FIGS. 11, 12A, 12B and 13, FIG. 11 is a schematic view showing horizontal cuts of the radiation patterns of the third antenna array AT3 disposed in two different types of placements according to an embodiment of the present disclosure, FIG. 12A is a perspective view of the third antenna array disposed in a long side placement according to an embodiment of the present disclosure, FIG. 12B is a perspective view of the third antenna array disposed in a short side placement according to an embodiment of the present disclosure, and FIG. 13 is a top view showing an arrangement of the up-link circuit, the down-link circuit and the CPE according to an embodiment of the present disclosure.

In the present embodiment, a reference plane is defined, in which the up-link circuit UL, the down-link circuit DL, and the CPE are located. A radiation pattern of the CPE on this reference plane is called the horizontal cut, and the number of the antenna element AE on this plane determines the short side displacement and the long side displacement. In a scenario for the third antenna array AT3 of the CPE, the long side displacement is chosen to provide a radiation pattern for the repeater 100 on the reference plane. However, as the pattern shown in FIG. 11, since a peak of the radiation pattern is pointed to the first transmitting antenna Tx1 of the repeater 100, the beam directed to the second receiving antenna Rx2 is going to have lower gain.

Figure 14:
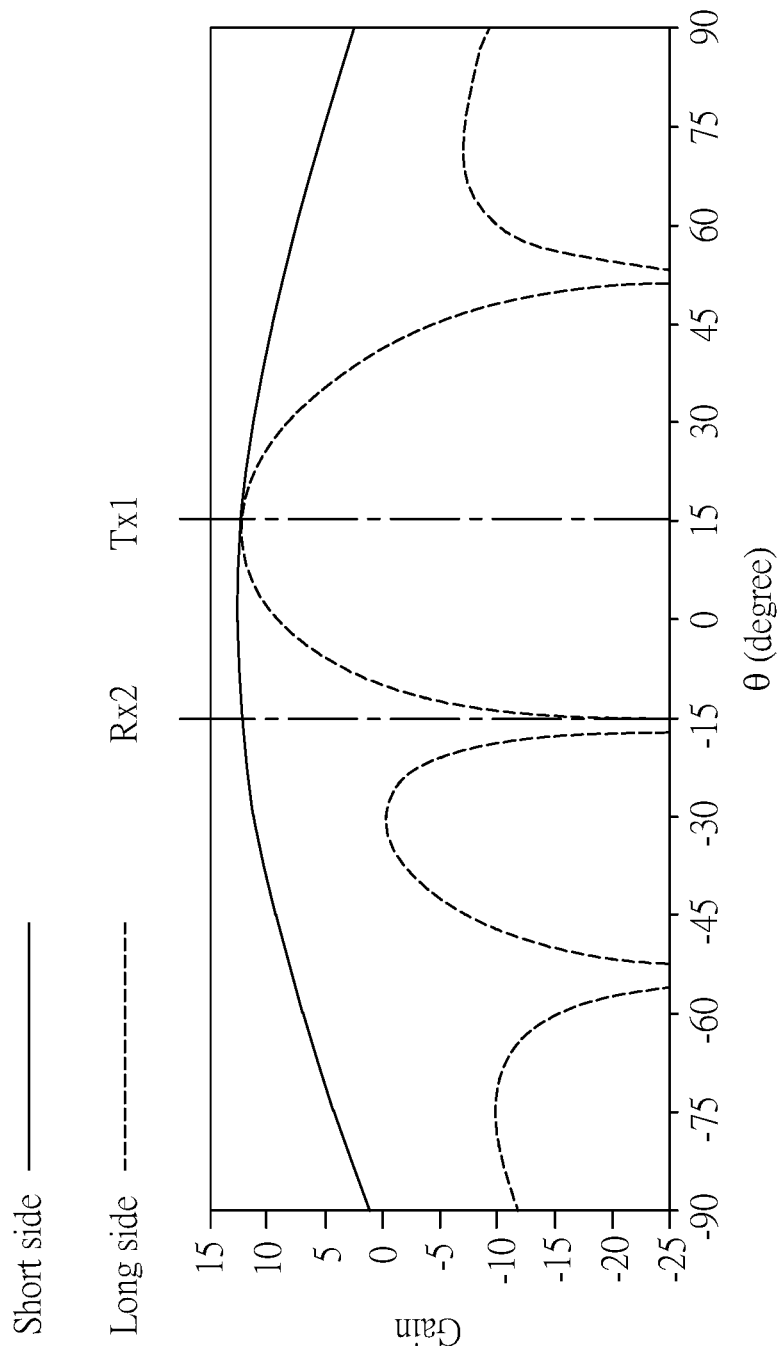
FIG. 14 is a schematic diagram showing a radiation pattern of the CPE according to an embodiment of the present disclosure.

Referring to FIG. 14, which is a schematic diagram showing a radiation pattern of the CPE according to an embodiment of the present disclosure. For example, if the relative positions of repeater 100 and the CPE are shown in FIG. 13, the included angle between first transmitting antenna array Tx1 and the 15 second receiving antenna array Rx2 is 30 degrees, (θa is 15° for the first transmitting antenna array Tx1 and θb is −15° for the second receiving antenna array Rx2) and the gain difference between beams directed to the first transmitting antenna array Tx1 and the second receiving antenna array Rx2 is larger than 30 dB, in which a gain of the down-link circuit DL is about 12 dBi, and a gain of the up-link circuit UL is smaller than −20 dBi, as shown in FIG. 14.

The degradation of the gain of the second receiving antenna Rx2 has to be compensated by the gain of the first transmitting antenna Tx1, or by the second power amplifier PA2 in the up-link circuit UL in the repeater 100. The increased loop gain, that is, the gain of the first transmitting antenna Tx1 plus the gain of the second receiving antenna Rx2, will worsen the isolation between the first transmitting antenna array Tx1 and the second receiving antenna array Rx2, and thus the space should be enlarged. However, the enlarged space results in a larger included angle between the first transmitting antenna array Tx1 and the second receiving antenna array Rx2, and leads to a larger gain difference, which is a vicious cycle eventually.

In order to avoid this situation, the short side displacement should be chosen alternatively. As shown in FIG. 14, the gain difference between beams directed to the first transmitting antenna array Tx and the second receiving antenna array Rx2 is about 0 dB in the short side displacement. Thus, the gain balance can be achieved by using the short side displacement.

Therefore, when the third antenna array AT3 is disposed in the short side displacement, a broader beam with lower gain difference between the first transmitting antenna array Tx1 and the second receiving antenna array Rx2 can be obtained to avoid large loop gain and reach gain balance.

Figure 15:
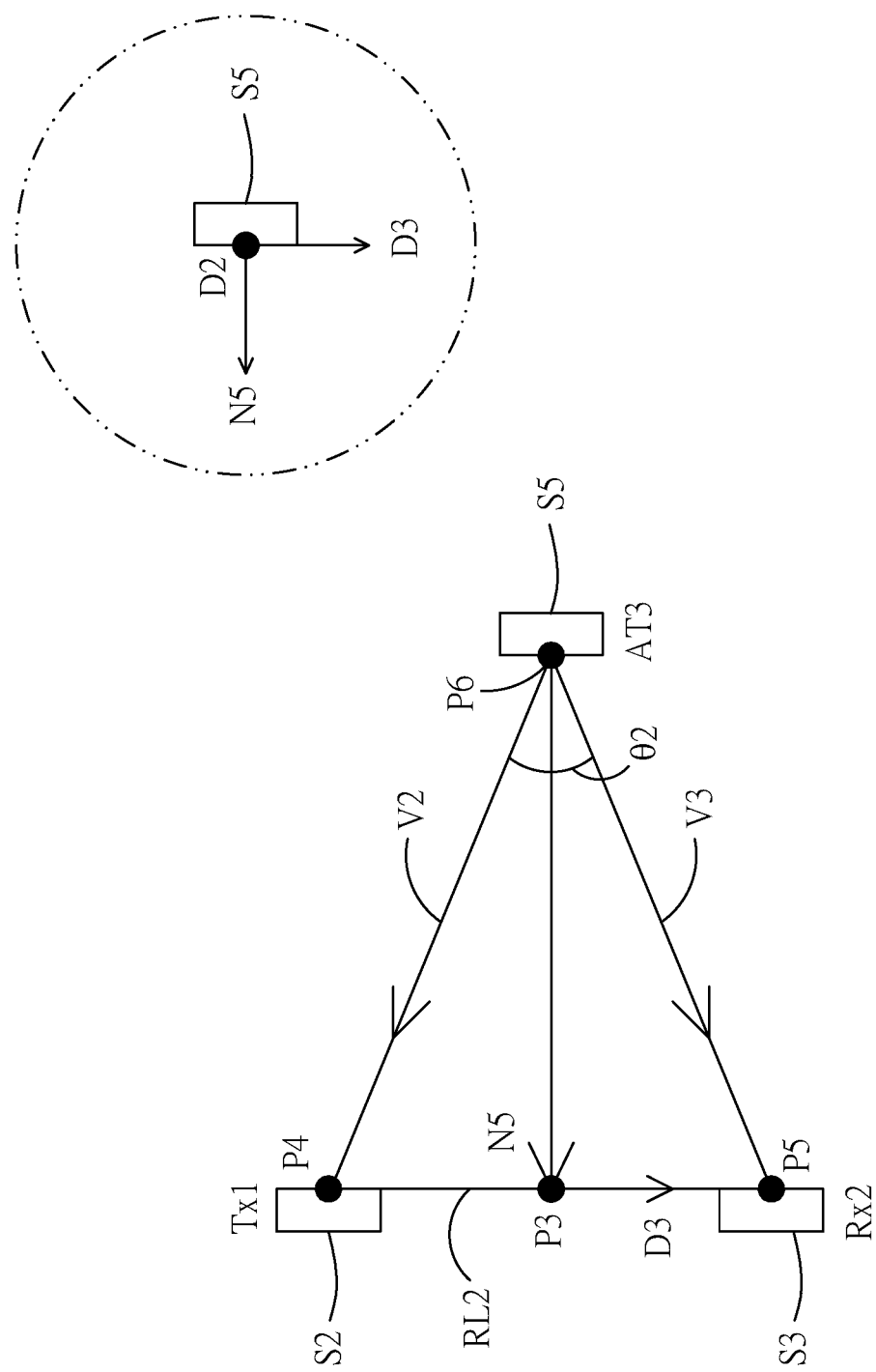
FIG. 15 is a top view showing an arrangement of the first transmitting antenna array, the second receiving antenna array and the third antenna array.

To further define the short side displacement, reference can be made to FIG. 15, which is a top view showing an arrangement of the first transmitting antenna array, the second receiving antenna array and the third antenna array according to an embodiment of the present disclosure.

As shown in FIG. 15, a normal direction N5 of the third antenna array AT3 directs to a third reference point P3 on a second reference line RL2 formed by a fourth reference point P4 on the second substrate S2 and a fifth reference point P5 on the third substrate S3.

Here, the first direction D1 is parallel to a third direction D3 along the second reference line RL2, and the second direction D2 is perpendicular to the third direction D3. Preferably, the second direction is perpendicular to a ground plane.

In certain cases, the third reference point P3 can locate at a middle point between the fourth reference point P4 and the fifth reference point P5, and a second angle is provided between a second vector V2 from a sixth reference point P6 on the fifth substrate S5 to the fourth reference point P4 and a third vector V3 from the sixth reference point P6 to the fifth reference point P5. Preferably, the second angle can range from 20 degrees to 40 degrees.

In conclusion, the wireless communication system provided by the present disclosure utilizes the Space Division Duplex (SDD) architecture, in which the down-link circuit is separated from the up-link circuit with a predetermined distance, so as to provide enough isolation between the up-link circuit and the down-link circuit.

Furthermore, the wireless communication system provided by the present disclosure utilizes orthogonal polarizations between the receiving ends and the transmitting ends of the repeater, thereby enhancing four types of isolations to allow a full-duplex repeater to work properly.

In addition, the wireless communication system provided by the present disclosure provides the short side displacement for the third antenna array of the CPE, thereby obtaining a broader beam with lower gain difference between the first transmitting antenna array and the second receiving antenna array to avoid large loop gain and reach gain balance.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wireless communication system, comprising:
a customer premise equipment (CPE); and
a repeater, including:
a down-link circuit, including:
a first receiving antenna array disposed on a first substrate and configured to receive signals from a base station; and
a first transmitting antenna array disposed on a second substrate and coupled to the first receiving antenna array, wherein the first transmitting antenna array is configured to transmit signals to the CPE; and
an up-link circuit, including:
a second receiving antenna array disposed on a third substrate, wherein the second receiving antenna array is configured to receive signals from the CPE; and
a second transmitting antenna array disposed on a fourth substrate and coupled to the second receiving antenna array, wherein the second transmitting antenna array is configured to transmit signals to the base station,
wherein the down-link circuit is separated from the up-link circuit with a first predetermined distance,
wherein a first vector is provided along a first reference line formed by a first reference point on the first substrate and a second reference point on the fourth substrate, and a first angle is provided between the first vector and a normal vector of the first reference plane,
wherein the CPE includes a third antenna array disposed on a fifth substrate,
wherein the third antenna array includes a plurality of antenna elements arranged as a two-dimensional array, wherein the two-dimensional array has M antennas elements arranged along a first direction and N antenna elements arranged a second direction, the first direction is perpendicular to the second direction, and the first direction and the second direction are perpendicular to a normal direction of the fifth substrate, and
wherein M and N are integers, and M is smaller than N.

2. The wireless communication system according to claim 1, wherein the first substrate is disposed along a first reference plane, the fourth substrate is disposed along a second reference plane, and the first reference plane is substantially parallel with the second reference plane.

3. The wireless communication system according to claim 1, wherein the first angle ranges from 80 degrees to 100 degrees.

4. The wireless communication system according to claim 1, wherein the first receiving antenna array and the first transmitting antenna array are orthogonally polarized with each other.

5. The wireless communication system according to claim 1, wherein the second receiving antenna array and the second transmitting antenna array are orthogonally polarized with each other.

6. The wireless communication system according to claim 1, wherein the first receiving antenna array and the second transmitting antenna array are orthogonally polarized with each other.

7. The wireless communication system according to claim 1, wherein the second receiving antenna array and the first transmitting antenna array are orthogonally polarized with each other.

8. The wireless communication system according to claim 1, wherein the first predetermined distance ranges between 1 meters to 6 meters.

9. The wireless communication system according to claim 1, wherein the first transmitting antenna array and the second receiving antenna array are each separated from the CPE with a second predetermined distance and a third predetermined distance, respectively, wherein the second predetermined distance and the third predetermined distance are shorter than the first predetermined distance.

10. The wireless communication system according to claim 9, wherein the second predetermined distance and the third predetermined distance range from 1 meter to 3 meters.

11. The wireless communication system according to claim 1, wherein the down-link circuit further includes:
a first low noise amplifier (LNA), coupled to the first receiving antenna;
a first buffer circuit coupled to the first LNA; and
a first power amplifier (PA) coupled between the first buffer circuit and the first transmitting antenna array; and
wherein the up-link circuit further includes:
a second LNA coupled to the second receiving antenna array;
a second buffer circuit coupled to the second LNA;
a second PA coupled between the second buffer circuit and the second transmitting antenna array.

12. The wireless communication system according to claim 1, wherein the normal direction of the third antenna array directs to a third reference point on a second reference line formed by a fourth reference point on the second substrate and a fifth reference point on the third substrate, and
wherein the first direction is parallel to a third direction along the second reference line, and the second direction is perpendicular to the third direction.

13. The wireless communication system according to claim 12, wherein the third reference point is at a middle point between the third reference point and the fourth reference point, and a second angle is provided between a second vector from a sixth reference point on the fifth substrate to the fourth reference point and a third vector from the sixth reference point to the fifth reference point, and the second angle ranges from 20 degrees to 40 degrees.

14. The wireless communication system according to claim 1, wherein the second direction is perpendicular to a ground plane.

15. A wireless communication system, comprising:
a customer premise equipment (CPE); and
a repeater, including:
a down-link circuit, including:
a first receiving antenna array disposed on a first substrate and configured to receive signals from a base station; and
a first transmitting antenna array disposed on a second substrate and coupled to the first receiving antenna array, wherein the first transmitting antenna array is configured to transmit signals to the CPE; and
an up-link circuit, including:
a second receiving antenna array disposed on a third substrate, wherein the second receiving antenna array is configured to receive signals from the CPE; and
a second transmitting antenna array disposed on a fourth substrate and coupled to the second receiving antenna array, wherein the second transmitting antenna array is configured to transmit signals to the base station,
wherein the down-link circuit is separated from the up-link circuit with a first predetermined distance,
wherein a first vector is provided along a first reference line formed by a first reference point on the first substrate and a second reference point on the fourth substrate, and a first angle is provided between the first vector and a normal vector of the first reference plane, and
wherein the first predetermined distance ranges between 1 meters to 6 meters.

16. A wireless communication system, comprising:
a customer premise equipment (CPE); and
a repeater, including:
a down-link circuit, including:
a first receiving antenna array disposed on a first substrate and configured to receive signals from a base station; and
a first transmitting antenna array disposed on a second substrate and coupled to the first receiving antenna array, wherein the first transmitting antenna array is configured to transmit signals to the CPE; and
an up-link circuit, including:
a second receiving antenna array disposed on a third substrate, wherein the second receiving antenna array is configured to receive signals from the CPE; and
a second transmitting antenna array disposed on a fourth substrate and coupled to the second receiving antenna array, wherein the second transmitting antenna array is configured to transmit signals to the base station,
wherein the down-link circuit is separated from the up-link circuit with a first predetermined distance,
wherein a first vector is provided along a first reference line formed by a first reference point on the first substrate and a second reference point on the fourth substrate, and a first angle is provided between the first vector and a normal vector of the first reference plane,
wherein the first transmitting antenna array and the second receiving antenna array are each separated from the CPE with a second predetermined distance and a third predetermined distance, respectively, and
wherein the second predetermined distance and the third predetermined distance are shorter than the first predetermined distance.

* * * * *